United States Patent Office 2,697,710
Patented Dec. 21, 1954

2,697,710

PYRIDO (2,3-d) PYRIMIDINES AND METHOD OF PREPARING SAME

George H. Hitchings, Tuckahoe, and Roland K. Robins, Yonkers, N. Y., assignors to Burroughs Wellcome & Co. (U. S. A.) Inc., Tuckahoe, N. Y., a corporation of New York No Drawing. Application January 2, 1953, Serial No. 329,475

5 Claims. (Cl. 260—256.4)

This invention comprises a new group of pyrido (2,3-d) pyrimidines which may be represented by the following formula:

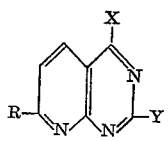

wherein X and Y are selected from the class consisting of mercapto, phenoxy, amino and substituted amino radicals providing further that the class from which X is selected includes the hydroxyl radical and the class from which Y is selected includes the chloro group, and R is selected from the class consisting of hydrogen and alkyl groups.

The compounds disclosed herein are useful as pharmaceutical intermediates and as inhibitors of micro-organisms such as lactic acid bacteria.

They are prepared by the reaction of 2,4-dichloro-pyrido (2,3-d) pyrimidine with suitable reagents as illustrated in the examples given below.

EXAMPLE 1

*Preparation of 2,4-diaminopyrido (2,3-d pyrimidine*

To 20 ml. of absolute ethanol saturated at 0° with dry ammonia was added 6.5 g. of crude 2,4-dichloro-pyrido (2,3,-d) pyrimidine. The solution was then placed in a bomb and heated at 150° for 12 hours. To the alcoholic solution was then added 30 ml. of water and 10 ml. of 2 N sodium hydroxide and the solution gently warmed on the steam bath and then cooled 5 hours in the refrigerator. The precipitate was filtered, washed with a little water and recrystallized from 500 ml. of a 50% ethanol-water mixture to which had been added 0.5 ml. of 2 N sodium hydroxide. The chilled solution yielded 3.9 g. of colorless needles, M. P. 356° (dec.).

EXAMPLE 2

*Preparation of 2-chloro-4-hydroxypyrido (2,3-d) pyrimidine*

Three grams of finely pulverized 2,4-dichloropyrido (2,3-d) pyrimidine was added to 75 ml. of 1 N sodium hydroxide at room temperature. When all the 2,4-dichloropyrido (2,3-d) pyrimidine had dissolved a small amount of norite was added and the solution allowed to stand 15 minutes at room temperature. The solution was filtered and cooled and acidified with glacial acetic acid. Upon standing overnight in the refrigerator the solution yielded 2.4 g. of tan needles. The compound did not melt below 360°.

EXAMPLE 3

*Preparation of 2-amino-4-hydroxypyrido (2,3-d) pyrimidine*

In a glass-lined bomb was placed 3.1 g. of 2-chloro-4-hydroxypyrido (2,3-d) pyrimdine and 20 ml. of alcoholic ammonia. The bomb was heated to 150° for 15 hours. The soultion was then diluted with 80 ml. of water, cooled and filtered and washed with cold water. The yield of almost colorless 2-amino-4-hydroxypyrido (2,3-d) pyrimidine was 2.4 g., M. P. >360°.

EXAMPLE 4

*2-chloro-4-aminopyrido (2,3-d) pyrimidine*

Ten grams of 2,4-dichloropyrido (2,3-d) pyrimidine (M. P. 156°–157°) was finely powdered and suspended in 300 ml. of concentrated ammonium hydroxide. The solution was carefully heated on the steam bath for two hours, cooled and filtered. The slightly yellow precipitate was then stirred with 200 ml. of 1 normal sodium hydroxide for one-half hour to remove any unreacted starting material. The filtered precipitate was then washed repeatedly with water. The yield was 8.1 g. The compound decomposed when heated above 310°. No suitable recrystallization solvent could be found.

EXAMPLE 5

*2,4-dimercaptopyrido (2,3-d) pyrimidine*

METHOD A

Four grams of 2,4-dichloropyrido (2,3-d) pyrimidine was added slowly with stirring to 150 ml. of 4 normal sodium hydrosulfide. The solution was warmed for fifteen minutes on the steam bath, diluted with 100 ml. of water, cooled and acidified with acetic acid. The yellow-green precipitate was filtered and dried at 130° to yield 3.5 g., M. P. >360° A small amount was purified for analysis by dissolving in dilute sodium hydroxide and precipitating with acetic acid.

METHOD B

Twenty grams of 2,4-dihydroxypyrido (2,3-d) pyrimidine and 100 g. of finely pulverized phosphorus pentasulfide and 500 ml. of tetralin were heated together for two hours at 200° to 205° (inside temperature). The solution was then cooled and filtered and the precipitate washed with Skellysolve "B." The precipitate was dissolved in 600 ml. of cold 3 N sodium hydroxide and the solution was then acidified with an excess of acetic acid and filtered. The yellow-green precipitate was washed and dried at 130°, to yield 23.0 g. This product was identical with the material obtained by method A as judged by the identical ultraviolet absorption spectra.

EXAMPLE 6

*Preparation of 2-mercapto-4-aminopyrido (2,3-d) pyrimidine*

METHOD A

Five grams of 2,4-dimercaptopyrido (2,3-d) pyrimidine (crude), method B, was finely powdered and added to 150 ml. of concentrated ammonium hydroxide and the solution heated on the steam bath for two hours. All of the starting material soon dissolved and after 15 to 20 minutes a precipitate was noted. The solution was filtered hot and the product suspended in concentrated ammonium hydroxide and heated for 1 hour on the steam bath and solution filtered hot and washed with a little cold aqueous ammonia. The yield of fine yellow-green needles was 3.5 g.

METHOD B 2.3 g. of finely powdered 2-chloro-4-aminopyrido (2,3-d) pyrimidine was added slowly to a solution of 4 N.NaSH and the solution heated on the steam bath for 2 hours during which time a small amount of hydrogen sulfide was continually bubbled through the solution. The solution was then heated with charcoal, filtered and acidified with acetic acid. The product was purified by dissolving in dilute sodium hydroxide and precipitating with acetic acid. Yield was 1.5 g. The ultraviolet absorption spectrum was that of the substance prepared by Method A.

EXAMPLE 7

*Preparation of 2-mercapto-4-hydroxypyrido (2,3-d) pyrimidine*

METHOD A

Twenty grams of α-aminonicotinic acid and 30 g. of thiourea were heated together at 200° (temp. of melt). The clear yellow melt thickened as the temperature was gradually raised to 210° and after 5 minutes at 210° the heating was discontinued. The solution was dissolved in dilute sodium hydroxide and the solution diluted at 350 ml. and heated on the steam bath while being saturated with carbon dioxide. The solution was then cooled and filtered and the precipitate washed with cold water. Yield 5.0 g. The product was purified by suspension in 400 ml. of hot water and enough dilute sodium hydroxide added to effect solution. The hot solution was acidified with acetic acid and the solution was filtered hot to yield 2.3 g. of white powder, M. P. 355°–356°.

METHOD B

Three hundred milligrams of 2-chloro-4-hydroxypyrido (2,3-d) pyrimidine was warmed with 4 N.NaSH on the steam bath. The solution was filtered and acidified with acetic acid and purified by dissolving in dilute sodium hydroxide and precipitating from the hot solution with acetic acid. Yield was 230 milligrams. M. P. and mixed M. P. with the 2-mercapto-4-hydroxy compound prepared by Method A was 355°–356° (unc.). Ultraviolet absorption spectra of the two products (Method A and Method B) were identical.

METHOD C 2-mercapto-4-aminopyrido (2,3-d) pyrimidine 0.5 g. was suspended in 25 ml. of 2 N hydrochloric acid and the solution heated 2.5 hours on the steam bath. The solution was filtered and the precipitate washed with water. Yield was 0.42 g. This product was identical with that obtained by Methods A and B, as judged by mixed M. P. and ultraviolet absorption data.

EXAMPLE 8

Preparation of 2,4-diphenoxypyrido (2,3-d) pyrimidine

To a solution of 3 g. of potassium hydroxide in 30 ml. of phenol was added 4.0 g. of 2,4-dichloropyrido (2,3-d) pyrimidine slowly over a period of 10 minutes. The reaction mixture was maintained at 40°–50° during this addition and then gradually heated to 80°. The reaction mixture was poured into 200 ml. of 2 N sodium hydroxide and the cold solution filtered and washed with cold water. The crude precipitate was recrystallized from 95% ethanol to yield 2.6 g. of white needles, M. P. 203°–205°.

EXAMPLE 9

Preparation of 2,4-dianilinopyrido (2,3-d) pyrimidine

To 25 ml. of water and 5 g. of aniline was added carefully with shaking, 2.0 g. of 2,4-dichloropyrido (2,3-d) pyrimidine and the solution was heated for 3 hours on the steam bath. The solution was made basic with concentrated ammonium hydroxide, filtered and washed once with cold ethanol. This crude product contained about one molecule of hydrochloric acid for two of the base. The crude mixture was suspended in 100 ml. of hot normal sodium hydroxide and enough alcohol added to effect solution. Upon cooling 2.1 g. of light green needles, M. P. 235°–237° was isolated. The compound was recrystallized from ethanol-water mixture with no change in melting point.

EXAMPLE 10

Preparation of 2,4-bis(dimethylamino) pyrido (2,3-d) pyrimidine

To 30 ml. of 25% solution of aqueous dimethylamine was added 5.0 g. of 2,4-dichloropyrido (2,3-d) pyrimidine and the solution was then heated 2 hours on the steam bath. The solution was then allowed to evaporate to dryness and the residue dissolved in 200 ml. of water and the solution made strongly basic with sodium hydroxide and extracted twice with 200 ml. of chloroform. The chloroform was washed with water and dried over anhydrous magnesium sulfate. Evaporation of the chloroform left a brown oil which solidified on cooling. Repeated extraction of this residue with boiling Skelly "C" and concentration of the solution yielded upon cooling 2.9 g. of white crystals M. P. 95°–97°. Recrystallization from the same solvent raised the M. P. to 97–99°.

EXAMPLE 11

Preparation of 2,4-dihydrazinopyrido (2,3-d) pyrimidine

To 20 ml. of 85% hydrazine was added very slowly 5.0 g. of 2,4-dichloropyrido (2,3-d) pyrimidine and the solution was heated for 2 hours on the steam bath, cooled and filtered, washed with ethanol and purified by soxhlet extraction using absolute ethanol as a solvent. Yield of small orange needles was 1.6 g. M. P. 348°–350° (dec.).

EXAMPLE 12

Preparation of 2-anilino-4-hydroxypyrido (2,3-d) pyrimidine

To 0.5 g. of aniline in 25 ml. of water was added 0.5 g. of 2-chloro-4-hydroxypyrido (2,3-d) pyrimidine (Example 2). The solution was heated one hour on the steam bath and then a little sodium hydroxide was added and the basic solution was extracted with ether to remove the excess aniline. The basic solution was then carefully acidified with acetic acid to yield 0.4 g. of light green product. Recrystallization from glacial acetic acid yielded light yellow-green needles, M. P. 350°–252°.

EXAMPLE 13

2,4-dihydroxy-7-methylpyrido (2,3-d) pyrimidine

Twenty grams of 6-methyl-2-aminonicotinic acid and 45 g. of urea were heated together at 180°–200° until the melt was clear. The temperature was gradually raised to 220° and the heating discontinued when the mixture thickened. The cooled solid was dissolved in 350 ml. of hot 4 N sodium hydroxide and the warm solution saturated with carbon dioxide. The cooled solution was filtered and washed with cold water; yield was 14.6 g. Three grams of the crude product was recrystallized from glacial acetic acid to give 2.7 g., M. P. 314°–315°.

EXAMPLE 14

Preparation of 2,4-dichloro-7-methylpyrido (2,3-d) pyrimidine

To 250 ml. of phosphorus oxychloride was added 10 g. of crude 2,4-dihydroxy-7-methylpyrido (2,3-d) pyrimidine and the solution was refluxed for 2½ hours. The excess phosphorus oxychloride was distilled off under vacuum and the syrupy residue poured on ice and extracted with chloroform. Evaporation of the chloroform yielded 1.7 g. of crude purple-red product, M. P. 155°–160°.

A small amount was recrystallized from heptane to yield orange plates, M. P. 164°–169°.

EXAMPLE 15

Preparation of 2,4-diamino-7-methylpyrido (2,3-d) pyrimidine

To 20 ml. of alcoholic ammonia (saturated at 0° C.) was added 1.2 g. of crude 2,4-dichloro-7-methylpyrido (2,3-d) pyrimidine and the solution heated overnight in a bomb at 155°. The excess alcohol and ammonia were evaporated on the steam bath and the residue suspended in 30 ml. of normal sodium hydroxide. The solution was filtered and recrystallized from an ethanol-water mixture. Yield=0.5 g. M. P. 315° (dec.), slightly yellow colored needles.

We claim:

1. The method of preparing compounds of the formula wherein X and Y are selected from the class consisting of mercapto, phenoxy and amino radicals, providing further that the class from which X is selected includes the hydroxyl radical and that from which Y is selected includes the chloro group, and R is selected from the class consisting of hydrogen and lower alkyl groups, which comprises reacting a 2,4-dichloropyrido (2,3-d) pyrimidine with a reagent selected from the class consisting of the amines, ammonia, mercapto compounds and phenols and recovering the product.

2. The method set forth in claim 1 wherein the reagent employed is an amine.

3. The method set forth in claim 1 wherein the reagent employed is ammonia.

4. The method set forth in claim 1 wherein the reagent employed is a mercapto compound.

5. The method set forth in claim 1 wherein the reagent is a phenol.

No references cited.